Figures 1, 2, 3:
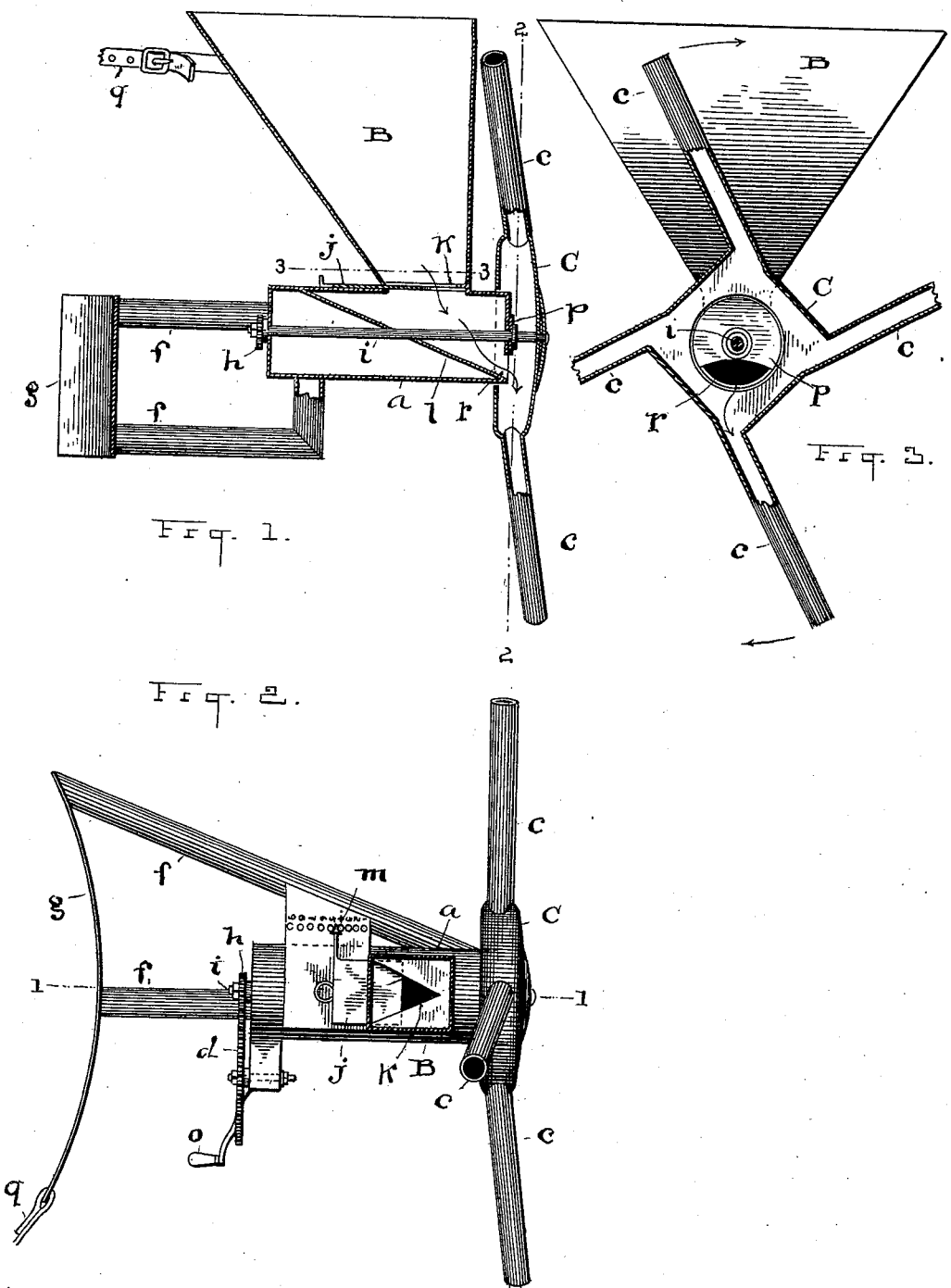

(No Model.)

J. M. RICKEY.
SEED SOWING MACHINE.

No. 587,374. Patented Aug. 3, 1897.

Witnesses

Inventor.
Joseph M. Rickey
By H. T. Fisher Atty

THE NORRIS PETERS CO., PHOTO-LITHO., WASHINGTON, D. C.

UNITED STATES PATENT OFFICE.

JOSEPH M. RICKEY, OF CLEVELAND, OHIO.

SEED-SOWING MACHINE.

SPECIFICATION forming part of Letters Patent No. 587,374, dated August 3, 1897.

Application filed August 24, 1896. Serial No. 603,808. (No model.)

*To all whom it may concern:*

Be it known that I, JOSEPH M. RICKEY, a citizen of the United States, residing in the city of Cleveland, Cuyahoga county, and State of Ohio, have invented a new and Improved Broadcast Seed-Sowing Machine, of which the following is a specification.

My invention relates to centrifugal seed-sowing machines which are supported on the person of the operator and are operated by hand; and the object of the invention is, first, to furnish a machine in which is substantially overcome the excessive friction of the revolving head through which the seed is scattered by centrifugal force, and, secondly, to scatter the seed more regularly and evenly than heretofore in machines of this variety.

In the accompanying drawings, Figure 1 is a side elevation, partly in section, of my new and improved seed-sowing machine. Fig. 2 is a plan view thereof. Fig. 3 is a partly sectional elevation of a revolving head with tubular arms for sowing or distributing the seed.

Referring now to Figs. 1 and 2, $a$ represents a cylindrical body forming the central and supporting member of the machine and to or around which the other parts are built. This body is preferably made of tin, so as to secure lightness with serviceability, and other parts of the machine likewise are of tin for the same reason, though of course other metal may be used for any of the said parts, if preferred.

B is a hopper supported on cylinder $a$. Both ends of the cylinder $a$ are closed by caps fastened, preferably, by solder, and journal-bearings for the central shaft $i$ are soldered onto the outside and center of the said caps at both ends of the cylinder. In these bearings is journaled the shaft $i$, and a pinion $h$ on the rear end of the shaft meshes with the driving gear-wheel $d$, which is provided with a crank-handle $o$ in convenient position to be rotated by the operator. The gear $d$ is supported on a lateral projection rigid with the cylinder $a$. The bottom $k$ of the hopper B opens into the said cylinder $a$ through a triangular or substantially V-shaped opening. This opening is controlled by a slide or gate $j$, that is movable in or out as may be required to regulate the flow of seed from the hopper, the said slide or gate diminishing or enlarging the opening $k$ as may be required and according to the kind of seed sown and the volume wanted. A pointer $m$, having a projection, extends laterally from the outer end and edge of the slide $j$ and is adapted to engage in any one of a series of holes, (indicated by Figs. 1, 2, 3, &c.,) so that the feed-slide may be held at any place to which it may be set.

C is the revolving head, through which the seed is received from the cylinder $a$ and distributed or sown by means of the distributing-tubes or hollow arms $c$. This head may be either substantially square or other equivalent form, and has a series of distributing-tubes, as shown in the drawings, respectively. The said head is hollow and the inner side is cut away to just fit over the end of cylinder $a$, but not to ride thereon or to have any bearing whatever on said cylinder. Such closeness as will prevent seeds from working out at this point will suffice, but it should be free to avoid all contact and friction.

Two peculiarities characterize the setting of the distributing-tubes in head C. In the first place all of them are set at one side of a radial line from the axis of the head and so that a projection of each tube will carry the line almost parallel to the corresponding side of the head, as here shown. This is done in order to get a uniform distribution of the seed in the head in respect to all of said tubes, whether three or four, and so that the machine will throw as much seed to the right as to the left, or to the left as to the right. Experience has shown me that if the tubes $c$ be radial from the axis or center of the head the larger proportion of the seed is carried over and distributed on one side or the other of the operator, and generally on the left side. This is a fatal objection in a machine of this kind, and hence the present construction and arrangement, with the distributing-arms set relatively to the axis of the head about as shown in either Fig. 1 or Fig 2. Again, I have found that when the distributing-tubes are in the same vertical plane at their outer extremities—for example, like the spokes of a wagon-wheel—they do not scatter the seed with breadth of throw enough to make the work uniform and even. Hence the extremities of the said arms are staggered in respect to one another, and some are inclined laterally in one direction from a vertical plane while others are at an inclination in the opposite direction, substantially as shown. This insures more equitable sowing because it prevents all the tubes from sowing in the same line at the same time and compensates for any irregularity in the movement of the operator and increases the scattering effect of the machine. The head, as here shown, is angular in form and the tubes $c$ are set in the angles of the head. This, it will be observed, is different from a circular head with radial tubes at regular intervals in the same plane.

The revolving head has the shaft $i$ fixed rigidly thereto, so as to be removable therewith, and in this instance I employ a couple of concavo-convex caps which are soldered to the head C and to which the shaft is soldered, thus making the engagement firm and durable and at the same time maintaining lightness of construction. These caps are spaced apart to make the engagement more effectual by extending the bearing of the shaft therein. At its opposite end the said shaft projects through pinion $h$, where it is fastened by a nut.

The bearing $p$ at the front of cylinder $a$ for the shaft $i$ is of copper, brass, or other suitable material and is soldered in the center of said cylinder to form a rigidly-fixed bearing for the shaft $i$ and the head C, carried thereby. This construction and arrangement of these parts reduces friction to the minimum and makes it very easy to operate the machine. The front end of cylinder $a$ is cut away at the bottom, as indicated by $r$, for the passage of the seed to head C, and a sheet-metal diaphragm or other smooth-surfaced diaphragm or chute $l$ is set at an inclination in the cylinder $a$ to carry the seed forward through the discharge $r$ into the head C. The shaft $i$ passes through this diaphragm, but does not interfere with the flow of the seed.

The machine is carried on the person by means of the curved body-rest $g$, supported by tubular braces $f$, and a strap $q$, engaged on the hopper, is adapted to pass over the shoulders, around the neck, and carry the load largely in that way.

To regulate the volume of feed of such small seeds as clover, timothy, and the like to a small and uniform flow is very difficult and differs altogether from larger seeds, such as wheat, oats, and the like. Hence I have devised this particular shape of opening or passage, which by reason of its shape can be reduced to the smallest size and yet afford a perfectly regular run of seed. It will be noticed that the point of the V-opening is from the slide and the slide closes always on the larger portion of the opening, and thus leaving the pointed portion always last to be closed.

What I claim as new, and desire to secure by Letters Patent, is—

1. The cylindrical body through which the seed is fed, the hopper thereon and a substantially V-shaped opening from the hopper to the cylinder, a cut-off to regulate the flow of seed through said opening, and a pointer and graduated scale to fix the said cut-off at any desired position according to the flow of seed wanted, in combination with a centrifugal distributer, substantially as described.

2. The machine substantially as described, having a cylindrical body through which the seed passes at its front end, and bearings for a shaft in both ends of said cylinder, a shaft supported in said bearings and a seed-distributing head fixed rigidly to said shaft, whereby friction is reduced to a minimum, substantially as described.

3. In a machine substantially as described, a revolving distributing-head having tubular distributing-arms set in lines at an inclination to radial lines from the axis of the head and off the axial center, substantially as described.

4. In a machine substantially as described, a centrifugal distributing-head for the seed having arms arranged to cause their outer ends to travel in different but substantially parallel planes and set in staggered relation to each other, substantially as described.

5. The machine substantially as described, having a centrifugal distributing-head, and arms in said head staggered in respect to each other so as not to sow on the same lines at the same time, and set at an inclination to lines radiating from the axis of the head, substantially as described.

JOSEPH M. RICKEY.

Witnesses:
FRED A. PEASE,
CH. DANTEL, Jr.